United States Patent [19]

Gagliardi, Jr.

[11] Patent Number: 4,728,524

[45] Date of Patent: Mar. 1, 1988

[54] RESTRUCTURED MEAT PRODUCTS AND METHODS OF MAKING SAME

[75] Inventor: Eugene D. Gagliardi, Jr., West Chester, Pa.

[73] Assignee: Creativators, Inc., West Chester, Pa.

[21] Appl. No.: 51,265

[22] Filed: May 5, 1987

Related U.S. Application Data

[63] Continuation of Ser. No. 808,672, Dec. 16, 1985, abandoned, which is a continuation of Ser. No. 596,760, Apr. 4, 1984, abandoned.

[51] Int. Cl.[4] .......................... A23L 1/314; A23P 1/00
[52] U.S. Cl. ..................................... 426/272; 426/513; 426/519; 426/641
[58] Field of Search ............... 426/272, 641, 513, 516, 426/518, 519

[56] References Cited

U.S. PATENT DOCUMENTS

| | | |
|---|---|---|
| 2,398,636 | 4/1946 | Henney et al. |
| 2,673,156 | 3/1954 | Minder |
| 3,076,713 | 2/1963 | Maas |
| 4,029,824 | 6/1977 | Langen ................................. 426/281 |
| 4,072,763 | 2/1978 | Mart ..................................... 426/513 |
| 4,258,068 | 3/1981 | Huffman .............................. 426/272 |
| 4,377,597 | 3/1983 | Shapiro et al. ........................ 426/92 |
| 4,378,379 | 3/1983 | Liesaus ............................. 426/513 X |

OTHER PUBLICATIONS

K. Kessler, "Restructued Meat: Promising Prop for Sagging Sales?", *The Furrow,* 22–23, 1984.

*Primary Examiner*—Arthur L. Corbin
*Attorney, Agent, or Firm*—Panitch Schwarze Jacobs and Nadel

[57] ABSTRACT

Restructured meat products are prepared from meat parts which are preferably fresh and without the addition of salt, phosphates and/or enzymes before or during the restructuring process. The process comprises slicing the meat parts, preferably across the meat grain, into slices about 1 to 3 mm thick, and preferably about 1.5 to 2 mm thick, said slices having a major surface area about as large as the meat parts will permit, generally averaging greater than about 10 cm$^2$ and preferably greater than about 20 cm$^2$, kneading said slices together in a mass to cause the slices to stick together by means of the natural juices which exude from the meat surface and by entanglement of the slices, and forming the mass of meat slices into a restructured meat product. The restructured meat product may consist of beef, pork, veal, lamb, chicken, turkey or mixtures thereof and may be made in the form of roasts, logs for slicing, cutlets or other convenient meat forms.

12 Claims, No Drawings

RESTRUCTURED MEAT PRODUCTS AND METHODS OF MAKING SAME

This application is a continuation of Ser. No. 808,672, filed Dec. 16, 1985, now abandoned, which is a continuation of Ser. No. 596,760, filed Apr. 4, 1984, now abandoned.

The present invention relates to restructured meat products and methods of making such meat products from meat parts, preferably fresh meat parts, which are intended to be cooked after restructuring. More particularly, the invention relates to the production of restructured meat products without the necessity of additives such as salt, phosphates or enzymes.

BACKGROUND OF THE INVENTION

During the past decade or so, a variety of restructured meat products have come onto the market with varying degrees of success and failure. The demand for such restructured products has grown out of the burgeoning fast food industry and the need to make use of carcass parts that ordinarily would be unusable or at best would be ground for hamburger or sausage. Restructured meat products offer the advantages of uniform appearance, composition, shape and size, as well as being generally less expensive and easier to prepare than whole-muscle meat cuts.

Typically, the restructuring involves cutting the meat into small chunks or flakes and mixing, tumbling or massaging these with salt, phosphates and/or enzymes in order to draw the natural meat juices to the surface to aid in binding the meat pieces together. This mixture is then pressed together mechanically to produce the restructured product in various forms, such as roasts, cutlets or logs which may be sliced for sandwich meats and the like.

One recent example of such a restructured meat product and method is disclosed in U.S. Pat. No. 4,377,597, wherein untenderized lean meat chunks and elongated thin strips of meat are treated with an aqueous solution of salt and phosphate to extract myosin from the muscle in the meat. The restructured product is then formed from the interspersed and intertwined strips and chunks which are partially held together by the adhesive action of the myosin. products of this type have not been completely successful, because even the very small amount of salt used deteriorates the bright red color of the natural meat to a less-appetizing brown and also causes oxidation with the attendant rancidity problems in a relatively short period of time.

An example of a restructured meat product, which does not require the use of additives such as salt, phosphates, enzymes and flavorants, is disclosed in U.S. Pat. No. 4,258,068 of Huffman. According to the Huffman process, fresh unheated meat is mechanically tenderized several times to release the binding materials from the meat and tenderize it. Thereafter, some of the tenderized meat in the form of wafer thin slices and some of the tenderized meat in the form of cubes (with connective tissue and gristle removed) are mixed, blended, formed into an initial desired shape, wrapped in a film-like material, freeze-tempered, pressed into a final desired shape and sliced for final freezing. While this process avoids the drawbacks of additives previously mentioned, the processing is quite long and complicated and the presence of chunks, even though tenderized, makes for a product with non-uniform tenderness and chewability.

BRIEF SUMMARY OF THE INVENTION

According to the present invention restructured meat products are prepared by slicing meat parts into thin slices having a thickness of about 1–3 mm and a large major surface area, preferably about as large as the natural whole meat part permits when cutting across the grain of the meat; kneading said slices together in a mass to cause the juices of the meat to exude from the slices until the slices begin to stick together by means of the juices; and forming the mass of meat slices into a restructured meat product which is held together by the adhesive nature of the meat juices and the entanglement of the slices. These restructured products do not require the use of additives such as salt, phosphates or enzymes in their manufacture, and it is preferred that such additives not be used.

The process and product of the present invention are applicable to any type of meat, including beef, pork, veal, lamb, chicken, turkey and mixtures thereof. While the use of fresh meat is preferred it is possible to use meat which has been frozen and thawed or tempered. The final products may make use of scraps and offcuts from conventional butchering operations and other ingredients.

DETAILED DESCRIPTION OF THE PREFERRED EMBODIMENTS

The present invention may make use of any part of the carcass of animals providing meat in which the natural juices of the meat have adhesive binding properties due to their content of binding proteins, particularly myofibrilar proteins including myosin, actin and actomyosin. Typical of such meats which are considered edible by humans are beef, pork, veal, lamb, chicken, turkey, as well as other fowl and wild animal meats such as venison. Since any part of the carcass may be used, there is a greatly improved efficiency in meat use as well as considerable savings in cost and consistent quality compared to the use of conventional whole meat cuts.

According to the invention, the meat parts to be processed into the restructured meat product are first cut into thin slices having a thickness of about 1 to 3 mm and preferably about 1.5 to 2 mm. The major surface area (one side) of these slices will vary considerably depending upon the meat types and parts from which the slices are made, as well as the direction in which the cuts are made. Generally, the slices should have a major surface area as large as the particular natural piece of meat (muscle) will permit. While larger pieces are attainable by slicing lengthwise to the whole meat piece, it is usually preferred to cut the slices across (transverse to) the grain of the meat. On the average the slices should have a major surface area greater than about 10 cm$^2$ and preferably greater than about 20 cm$^2$. Of course, slices having much larger major surface areas may be used, but generally it may not be as economical to use the larger meat parts which can be butchered and sold as whole meat cuts.

The slices formed in this step of the restructuring process are to be distinguished from the flakes of meat which are obtained and used in prior art restructured meat products. Such flakes are generally about the size of corn flakes and have major surface areas averaging much less than about 1 in.$^2$ (6 cm$^2$). Restructured meat products produced from such flakes tend to be too fine grained without much body or bite, being closer in consistency to products formed from ground meat than whole meat.

The thin slices used in the present invention are also to be distinguished from the chunks or cubes utilized in the restructured meat products of U.S. Pat. Nos. 4,377,597 and 4,258,068, described above. By avoiding the use of chunks or cubes, the restructured meat products of the present invention have a more uniform consistency and tenderness without tough spots which may occur where chunks or cubes are used.

The thin meat slices obtained above are kneaded together in a mass for a sufficient time to cause the natural juices of the meat to exude from the surfaces of the slices so that the slices begin to stick together by means of these juices. The amount of time needed for this to occur varies depending upon the particular type of meat being used and the particular apparatus being used to knead the meat. Typically, the kneading step should not take more than about 5 to 10 minutes, and generally less than about 5 minutes is required.

The particular apparatus used to knead the meat slices is not critical and may include any type of apparatus which simulates the hand kneading of dough. That is, the kneading action will consist of a working of the mass of meat in and out, with successive squeezing, releasing, flattening, folding in and similar manipulations. As an example, a conventional mechanical dough kneader with a hook or paddle may be used for the kneading step of the present invention. A taffy candy making machine may also be used for this purpose.

This kneading step is to be distinguished from prior art processes which have been used to cause the natural juices of the meat to exude from the surfaces of the meat. Such prior art steps include, for example, the use of a double action mixer, a massager or a tumbler, such as referred to in Huffman U.S. Pat. No. 4,258,068. Such treatments of the meat are much more time consuming than the kneading action required in the present invention, typically requiring 15 to 30 minutes in a double action mixer or 4 to 6 hours or more in a tumbler or massager. Tumbling merely involves rolling and bouncing of the pieces over and against each other, and massaging is simply a stirring or churning of the pieces together. Such long periods of working of meat also cause considerable changes in the meat product which are undesirable, including possibly unnecessary toughening, loss of juices and/or heating of the meat, so that the resulting product becomes rubbery or too stiff.

As previously mentioned, an important feature of the present invention is that the use of additives such as salt, phosphates, enzymes and/or flavorants is not needed to cause the exudation of the natural meat juices from the meat surfaces. The elimination of such additives produces a much better final product which is less susceptible to oxidation and color deterioration.

It is preferred to use fresh meat parts in the restructured products of the present invention since better binding properties are obtained from the meat juices than with meat which has previously been frozen. However, it is still possible to produce satisfactory restructured meat products of the present invention using meat which has been frozen and then thawed or tempered prior to slicing. The advantage of using such frozen and tempered meat is that the slicing step is much easier to carry out with tempered meat than with fresh meat. Preferably, the meat should be fully thawed before the kneading step commences.

As the kneading step progresses, the mass of meat slices becomes more and more cohesive due in part to the adhesive binding properties of the natural meat juices which exude from the meat surfaces and due in part to the mechanical entanglement or intertwining of the meat slices. The slices in the mass extend and bend in all different directions, so that there is no particular alignment of the pieces or of the fiber and sinew in the meat. Even where the slices are cut transverse to the grain of the original whole meat parts, there is a buildup of fiber and sinew in the restructured product which gives the product a good bite and texture. At the point that the mass of meat slices does not readily fall apart, the kneading should be discontinued and the forming step begun. Kneading the slices for too long a period of time, much after the slices substantially stick together, may result in a final product which is too tough.

The forming of the mass of meat slices into a restructured meat product may take many different forms depending upon the final desired product. For example, the forming step may consist of molding the mass of meat slices into a roast or similar meat shape which resembles whole meat cuts conventionally used for ultimate cooking and carving by the consumer. Alternatively, the mass of meat slices may be extruded into a cylinder or log of meat for subsequent freezing and slicing into cutlets, wafer sliced sandwich meats or similar meat cuts. Other forms of the final restructured meat product will be apparent to those skilled in the art.

Generally speaking, the restructured meat products of the present invention after the forming step may be handled as any normal whole muscle meat product, due to their excellent coherency and cutability. Thus, no particular precautions are needed, other than those normally used for whole meats, in the handling, storage or cooking of the restructured meat products.

The type of meat parts used to form the restructured product of the present invention will to a large extent determine the type of final product to be made. However, the final product may be varied in many ways by the use of various extenders and other ingredients. Generally, the only things which may be added before the kneading step are other natural meats or fats; otherwise the adhesion of the product may be altered or destroyed. However, during or after the forming step other ingredients may be added to improve the flavor, cost effectiveness or other properties of the meat. Such additional ingredients may include vegetables, sauces or even other meats in different forms such as ground or emulsified scraps or offcuts.

The resulting restructured meat products of the present invention have an extremely uniform tenderness and consistency while being virtually indistinguishable from high quality, whole meat cuts in appearance, taste and texture. The degree of toughness or tenderness of the restructured products of the invention can be controlled to a large degree by the thickness or thinness of the slices produced in the slicing step within the range of about 1 to 3 mm in thickness. While the optimum degree of toughness or tenderness may vary depending upon the particular type and/or grade of meat, a thickness of about 1.5 to 2 mm is generally preferred. Thicknesses much above 3 mm will approach the size of chunks or cubes of the prior art which give problems with toughness from the different grains in different orientations in the restructured product. Thicknesses much below about 1 mm are not only difficult to achieve, but result in slices which may tend to fall apart and produce products which are little different from ground or emulsified meat.

The present invention will now be further illustrated with reference to the following specific, non-limiting examples:

EXAMPLE I

Beef kabobs were prepared by slicing choice steer chucks and choice steer sirloin tails across the grain to a thickness of about 1.5–2 mm. The slices of sirloin tails were about 1.5 inches wide and 7 inches long, while the chuck slices were about 6–7 inches long and 5–6 inches wide. The slices were mixed together and kneaded by hand for a maximum of about 8 to 10 minutes at which point the slices did not readily fall apart. The mass of slices was then formed by hand into a long roll about 1.5 inches in diameter. There was no significant compression or compacting of the meat except by hand in forming the roll.

The formed roll was chilled until there was a frozen crust on the outer surfaces of the roll. The roll was then diced into cubes about 1.5 inches square, the cubes were put on a skewer and cooked on a broiler in the same manner as whole meat kabobs. These restructured beef kabobs behaved very similarly in all respects to whole meat beef kabob cubes.

EXAMPLE II

Restructured beef fillets were prepared from the same cuts and in the same manner as described above in Example I, except that the mass of kneaded meat was formed into a loaf approximately 5 inches in diameter and about 12 inches long. This loaf was slightly compacted by rolling in waxed paper by hand. The loaf was then baked in the same manner as a roast beef or was cut into 1¾ inch slices and cooked as fillets. The restructured roast held together as well as a whole meat roast and could be cut hot or cold and even held together well when sitting in its own juices. The fillets were virtually indistinguishable from whole meat fillets.

EXAMPLE III

A restructured lamb roast was prepared in the same manner as Example II above except that the cuts of meat used were the neck, shoulder and rack of lamb, including offcuts. The slices were as large as about 4 inches in diameter. As with the beef roast and fillets of Example II, the lamb roast held together very well and exhibited the properties of a high quality whole meat lamb roast.

EXAMPLE IV

Restructured veal cutlets were prepared using calf neck, rack, shoulder and shank cuts and slicing and kneading in the same manner as the previous examples. The slices were as large as 5–6 inches in diameter. A wad of the kneaded mixture was taken and flattened out as thin as possible (about ⅛–3/16 inch thick), frozen and dipped in a standard bread crumb and egg batter mixture. The resulting restructured veal product had the consistency of solid meat which was indistinguishable from a standard veal cutlet.

EXAMPLE V

Simulated barbeque pork ribs were prepared by slicing a five pound shoulder of pork across the grain into pieces about 1.5–2 mm thick. The slices were kneaded by hand for about 5 minutes. Two pounds of finely ground chicken meat were mixed with one cup of barbeque sauce and hand blended. This blend was then blended with the kneaded mass of pork slices and laid out in 6"×12" by ½" thick slabs. Using the back edge of a knife, transverse ridges and grooves were made in the upper surface of the slabs to resemble ribs. The slabs were then crust frozen, cut into strips about 1.5 inches wide, and the strips were placed lengthwise on skewers and cooked. The resulting simulated ribs had the taste and chew of real barbequed spare ribs without the bones. Slabs prepared in the same manner were also cooked as an entire slab of ribs.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A method of preparing a restructured meat product of substantially uniform consistency and tenderness and substantially devoid of chunks or cubes comprising the steps of:
    (a) slicing meat parts into thin slices having a thickness of about 1 to 3 mm and a major surface area greater than about 10 cm$^2$;
    (b) kneading said slices together in a tangled mass to cause the juices of the meat to exude from said slices until said slices begin to stick together by means of said juices, said kneading step comprising working of the meat mass in and out, with successive squeezing, releasing, flattening and folding in a manner which simulates the hand kneading of dough; and
    (c) forming said tangled mass of meat slices into a restructured meat product, said product being held together by the adhesive nature of meat juices and the entanglement of said slices.

2. A method according to claim 1 wherein said restructured meat product is made without the addition of salt, phosphates or enzymes to said meat prior to or during said kneading and forming.

3. A method according to claim 1 or 2 wherein said meat parts are fresh meat.

4. A method according to claim 1 or 2 wherein said slices have a thickness of about 1.5 to 2 mm and a major surface area greater than about 20 cm$^2$.

5. A method according to claim 1 or 2 wherein said slicing is done transversely to the grain of said meat parts and the slices have a major surface area about as large as the meat parts permit.

6. A method according to claim 1 or 2 wherein said forming step comprises extrusion of said mass into a log.

7. A method according to claim 1 or 2 wherein other ingredients selected from the group consisting of vegetables, sauces and other meat forms are incorporated into the restructured meat product after the kneading step.

8. A restructured meat product made by the method of claim 1 or 2.

9. A restructured meat product according to claim 8 wherein said meat is selected from the group consisting of beef, pork, veal, lamb, chicken, turkey and mixtures thereof.

10. A method according to claim 1 wherein said kneading step is discontinued at the point that the mass of meat slices does not readily fall apart.

11. A method according to claim 1 wherein said kneading step does not exceed about ten minutes in duration.

12. A method according to claim 1 or 2 wherein said meat parts are frozen meat which is tempered prior to slicing and thawed prior to kneading.

* * * * *